United States Patent
Dorland et al.

(10) Patent No.: US 10,052,934 B2
(45) Date of Patent: Aug. 21, 2018

(54) CONVEX GRID SHAPE TO REDUCE TURBULENCE UNDER ROTARY DOOR

(71) Applicant: DENSO International America, Inc., Southfield, MI (US)

(72) Inventors: Nathan Dorland, West Bloomfield, MI (US); Nicholas Mazzocco, Clawson, MI (US); Daniel Okray, St. Clair Shores, MI (US); Kurt Schulz, Commerce Township, MI (US); Melissa Buczek, Orion Township, MI (US)

(73) Assignee: DENSO International America, Inc., Southfield, MI (US)

( * ) Notice: Subject to any disclaimer, the term of this patent is extended or adjusted under 35 U.S.C. 154(b) by 764 days.

(21) Appl. No.: 13/891,766

(22) Filed: May 10, 2013

(65) Prior Publication Data
US 2014/0335774 A1    Nov. 13, 2014

(51) Int. Cl.
*B60H 1/34*      (2006.01)
*B60H 1/00*      (2006.01)

(52) U.S. Cl.
CPC ............ *B60H 1/00685* (2013.01); *B60H 2001/00085* (2013.01); *B60H 2001/00721* (2013.01)

(58) Field of Classification Search
CPC .............................. B60H 1/00685; B60H 1/34
USPC .......................................................... 454/139
See application file for complete search history.

(56) References Cited

U.S. PATENT DOCUMENTS

| | | | |
|---|---|---|---|
| 5,564,979 A * | 10/1996 | Sumiya | B60H 1/00685 454/121 |
| 5,836,813 A | 11/1998 | Miyata et al. | |
| 5,885,152 A * | 3/1999 | Wardlaw | 454/121 |
| 5,899,262 A * | 5/1999 | Yamaguchi | B60H 1/00835 165/103 |
| 5,988,263 A * | 11/1999 | Schwarz | B60H 1/0005 165/103 |
| 6,386,966 B1 | 5/2002 | Kuwayama et al. | |
| 6,435,960 B2 * | 8/2002 | Sato | 454/139 |
| 6,588,496 B2 * | 7/2003 | Nakagawa | B60H 1/00028 165/42 |
| 6,609,389 B2 * | 8/2003 | Ozeki et al. | 62/244 |
| 6,652,372 B2 * | 11/2003 | Muller | B60H 1/00671 454/156 |
| 6,814,138 B2 * | 11/2004 | Tsurushima | B60H 1/00692 165/202 |
| 6,979,258 B2 * | 12/2005 | Goupil, Jr. | B60H 1/00692 454/121 |
| 7,478,666 B2 * | 1/2009 | Yamamoto | B60H 1/00028 165/204 |
| 7,520,804 B2 * | 4/2009 | Venkatappa | B60H 1/00685 454/139 |
| 7,527,551 B2 * | 5/2009 | Goupil, Jr. | B60H 1/00692 165/43 |

(Continued)

FOREIGN PATENT DOCUMENTS

JP       09156345 A      6/1997

Primary Examiner — Steven B McAllister
Assistant Examiner — Samantha Miller

(57) ABSTRACT

A fresh air and recirculation air switching case using a rotary door, since an introduced air flows along an inner surface of a circumferential wall of the rotary door, a convex grid is formed on an inner surface of the circumferential wall of the rotary door. In this system, the air flow directed toward a suction inlet is prevented from becoming turbulent behind the rotary door and the air flow noise can be suppressed.

7 Claims, 4 Drawing Sheets

(56) References Cited

U.S. PATENT DOCUMENTS

| | | | |
|---|---|---|---|
| 7,530,889 B2 | 5/2009 | Marshall et al. | |
| 7,563,159 B2 | 7/2009 | Newman et al. | |
| 7,575,511 B2 | 8/2009 | Haupt et al. | |
| 7,699,690 B2* | 4/2010 | Spryshak | 454/139 |
| 8,091,623 B2* | 1/2012 | Hackl et al. | 165/202 |
| 8,342,922 B2* | 1/2013 | Deneau | B60H 1/00849 454/156 |
| 9,108,488 B2* | 8/2015 | Han | B60H 1/00678 |
| 9,139,069 B2* | 9/2015 | Makita | B60H 1/00692 |
| 2001/0008148 A1* | 7/2001 | Ito | B60H 1/00692 137/625.46 |
| 2001/0014582 A1* | 8/2001 | Ito | 454/69 |
| 2002/0009969 A1* | 1/2002 | Sato | 454/139 |
| 2003/0037918 A1* | 2/2003 | Lee | B60H 1/00064 165/202 |
| 2003/0143941 A1* | 7/2003 | Fujiwara | 454/139 |
| 2004/0067728 A1* | 4/2004 | Murakami et al. | 454/139 |
| 2005/0159097 A1* | 7/2005 | Newman | B60H 1/0005 454/156 |
| 2008/0026687 A1* | 1/2008 | Maehata | B60H 1/00685 454/69 |
| 2008/0200110 A1* | 8/2008 | Ghosh | B60H 1/00671 454/160 |
| 2009/0305623 A1* | 12/2009 | Lange | B60H 1/00671 454/121 |
| 2010/0126208 A1* | 5/2010 | Stammer et al. | 62/419 |
| 2011/0136426 A1* | 6/2011 | Kim | 454/139 |
| 2013/0000265 A1* | 1/2013 | Richter | B60H 1/00471 55/383 |

* cited by examiner

CONVEX GRID SHAPE TO REDUCE TURBULENCE UNDER ROTARY DOOR

FIELD

This present invention relates to the field of automotive heating ventilating and air conditioning systems, more specifically this invention relates to the fresh air/recirculation air switching rotary door.

BACKGROUND

This section provides background information related to the present disclosure which is not necessarily prior art.

In automotive vehicles, it is common to have a climate control system located within an instrument panel which provides heated or cooled air to occupants through dash panel defrost air outlets, instrument panel venting air outlets and floor directed air outlets. These traditional climate control systems often include a heater core that performs heat exchange between the engine coolant, which is heated by the engine, and the cool air in the cabin/outside environment, in order to provide warm air to the passenger compartment. Some vehicles include an air conditioning system that incorporates an evaporator for absorbing heat from the warm air in the cabin and from the outside environment. The heater core and evaporator are typically provided in an HVAC housing located in the passenger compartment of the vehicle. The evaporator and heater core are generally disposed downstream of a fan for communicating cooled or warmed air into the passenger compartment.

A fresh air/recirculation air switching case is also used in a vehicle climate control system for switching and introducing an outside air and an inside air into the fan then through the desired heat exchangers and ultimately to the passenger cabin of the vehicle. To control the amount of fresh outside air or recirculation air, a rotary door having an arc-shaped circumferential wall is disposed inside the case. The rotary door opens and closes an inside air introduction inlet and an outside air introduction inlet. In the fresh air/recirculation air switching case employing a rotary door creates a packaging advantage because the door installation space can be reduced as compared with an ordinary flat plate door.

However, according to the present inventors' experiments and evaluations, the inside fresh air/recirculation air switching case using a rotary door may create a problem that air flow noise increases and become objectionable to passengers in the vehicle. This noise is created by the introduced air flowing from one end to the other end of the circumferential wall of the rotary door along the inner surface thereof. As a result, the flow of the air creates a turbulent pocket underneath the circumferential wall of the rotary door which causes unwanted noise to enter in the passenger cabin of the vehicle.

U.S. Pat. No. 5,836,813 provided several ways to address this particular issue. This patent disclosed using a guide attached to the inside of the circumferential wall; this guide will direct the air flow and prevent turbulence. Additionally, this patent disclosed using a reflection plate, for irregularly reflecting the noise, this plate protrudes from the inner surface of the circumferential wall of the rotary door. However, neither embodiment fully eliminates the potential for turbulent flow from occurring under the circumferential wall.

U.S. Pat. No. 7,575,511 provides including a convex surface under the circumferential wall, however this patent discloses one solid surface. It is understood in the art that having an integrally molded rotary door with 2 curved opposite surfaces is extremely difficult to manufacture and control quality of the component itself. Additionally, adding the convex surface as a second piece to the rotary door complicates manufacturing and may reduce production efficiency.

It would be desirable to automotive HVAC system which provides an easily manufactured fresh air/recirculation air switching door that eliminates potential for turbulent air flow to occur under the circumferential wall and lead to unwanted noise in the vehicle cabin.

SUMMARY

This section provides a general summary of the disclosure, and is not a comprehensive disclosure of its full scope or all of its features.

The present invention is directed to a vehicle HVAC fresh air/recirculation air inlet case and rotary door that meet these needs. The vehicle HVAC comprises an inlet air flow casing having a first suction inlet and a second suction inlet. The first inlet for introducing recirculated air from a passenger compartment, the second inlet for introducing fresh air from outside the vehicle. Attached to the inlet casing is a scroll casing. The scroll casing is where a blower fan located. The scroll casing and blower fan are downstream of the air flow from inlet case and fresh air and recirculation air inlets. Within the inlet case is a rotary door, the rotary door can be rotated about its center axis to open and close the fresh air inlet and the recirculation inlet. The rotary door has an arc-shaped circumferential wall that spans the length of the door. Additionally, the rotary door has a convex arc-shaped grid portion protruding from an inner surface of the circumferential wall, the cross-section of the circumferential wall and convex grid create an oval shape.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
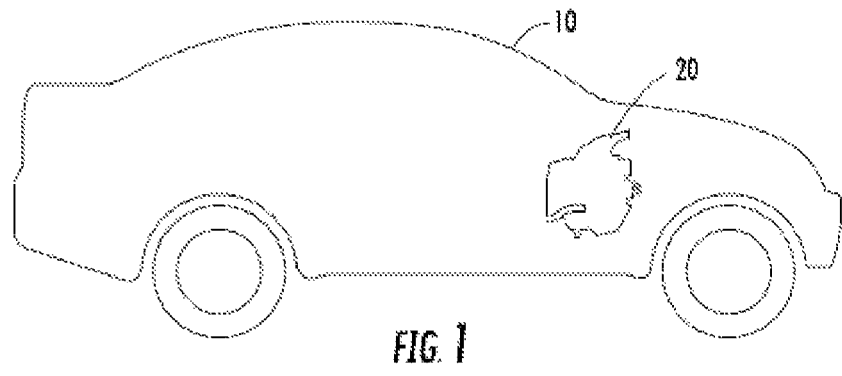
FIG. 1 is a schematic representation of a vehicle having a heating, ventilating and cooling system according to the principles of the present disclosure.

Example embodiments will now be described more fully with reference to the accompanying drawings. The following description is merely exemplary in nature and is not intended to limit the present disclosure, application, or uses.

It should be understood that throughout the drawings, corresponding reference numerals indicate like or corresponding parts and features.

Figure 2:
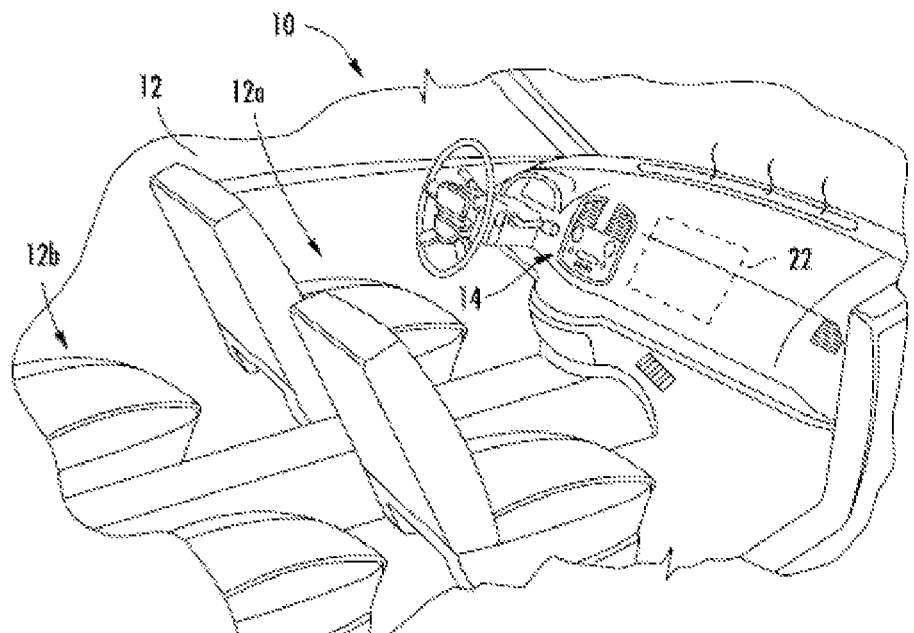
FIG. 2 is a fragmented perspective view of an automotive vehicle showing a portion of the passenger space.

Referring to FIGS. 1 & 2, an automotive vehicle 10 with an HVAC system 20 within which an HVAC module 22 according to the present teachings can be utilized is shown. Vehicle 10 includes a passenger space 12 which may have both a front passenger space 12*a* and a rear passenger space 12*b*. HVAC controls 14 allow adjustment of the operation of HVAC module 22 to provide desired flows of conditioned air.

Figure 3:
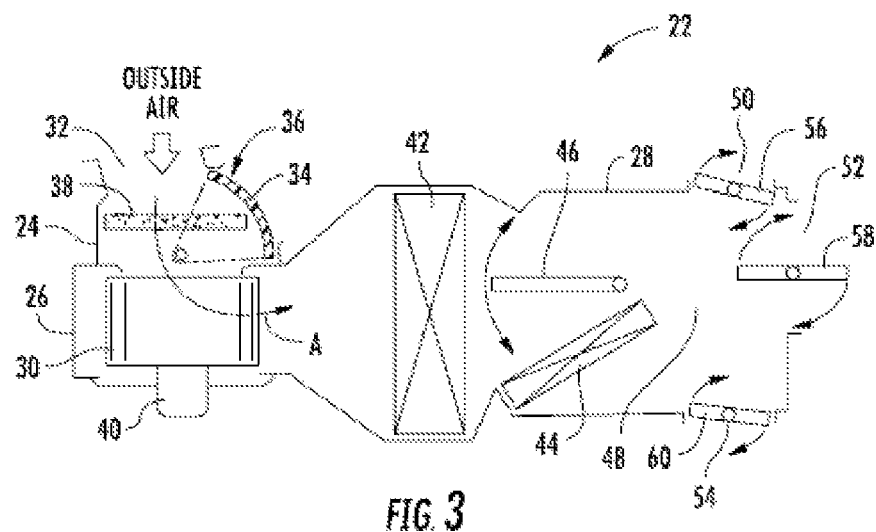
FIG. 3 is a simplified view of an HVAC module.

With reference to FIG. 3, a general layout of a conventional vehicle HVAC module 22 is shown and generally identified at reference 22. An HVAC module consists of different cases or housings. A fresh air/recirculation air switching case 24, also known as an inlet casing, which is connected to the scroll case 26, also referred to in the art as the blower case, which is attached to the mode case 28. All the casings may be made by a synthetic resin or plastic polymer material by way of non-limiting example. The scroll case 26 contains a fan 30 which is arranged on the upstream side of the mode case 28. Upstream of the scroll case 26 and fan 30 is the fresh air/recirculation air switching case 24. The fresh air/recirculation air switching case 24 contains two inlets. One inlet for introducing outside air to the passenger compartment 12, is known as the fresh air inlet 32. The other inlet for introducing inside air within the passenger compartment 12 is known as the recirculation inlet 34. Within the fresh air/recirculation air switching case 24, a fresh air/recirculation air switching rotary door 36 is rotatably disposed. FIG. 3 illustrates the rotary door 36 positioned to let outside air through the fresh air inlet 32. Also, an air filter 38 may be disposed within the fresh air/recirculation air switching case 24 downstream from the rotary door 36 to filter air prior to entering the scroll case 26 and fan 30. The air filter 38 may be constructed in such a manner that a filtering material made of corrugated paper, porous urethane foam or the like is supported with a resin frame member. Here, the entire configuration of the air filter 38 is a flat plate illustrated in FIG. 3. The air filter 38 removes the dust in the air, and if necessary, a deodorizing function may be performed, by adding an adsorbent for adsorbing malodorous components such as active carbon to the filtering material. It is understood in the art that the air filter 38 may be placed anywhere between the rotary door and blower fan 30. It is also understood in the art that the air switching case 24 and scroll case 26 may be a single case based upon specific application packaging.

Disposed below the fresh air/recirculation air switching case 24 is the scroll case 26. Within the scroll case 26, is an air blowing fan 30 consisting of a centrifugal multi-blade fan which is disposed at a central position of the scroll configuration. By the rotation of this fan 30, the air having been taken in from fresh air/recirculation air switching case 24 flows outwardly in a radial direction of the fan 30 as indicated by an arrow A. The air blowing fan 30 is connected to and rotated by a rotary shaft 60 (shown in FIG. 4) of a driving motor 40.

Connected to an air outlet side of the scroll case 26, is the mode case 28. Disposed within the mode case 28 is an evaporator 42 of the refrigeration cycle, the refrigeration cycle is driven by a compressor (not shown) as the driving source. The blown air is cooled and dehumidified by the evaporator 42. Downstream air side of the evaporator 42, the mode case 28 is equipped with a heater core 44 which heats the blown air by using the engine cooling water (hot water) as the heat source. An air mix door 46, also known as a mode door, is located adjacent to the heater core 44 and adjusts the ratio of air amounts between the air passing through and heated by the heater core 44 and the cool air bypassing the heater core 44, thus serving as temperature adjusting means for adjusting the temperature of the blown-out air to the passenger cabin 12.

Downstream of the heater core 44, the mode case 28 contains a mixing chamber 48 for mixing the warm air and the cool air, and the air mixed in the mixing chamber 48 and having a desired temperature is blown out into the passenger compartment 12 through a defroster air outlet 50, face air outlet 52 and foot air outlet 54. These air outlets are opened or closed by outlet mode doors 56, 58, and 60 respectively.

Figure 4:
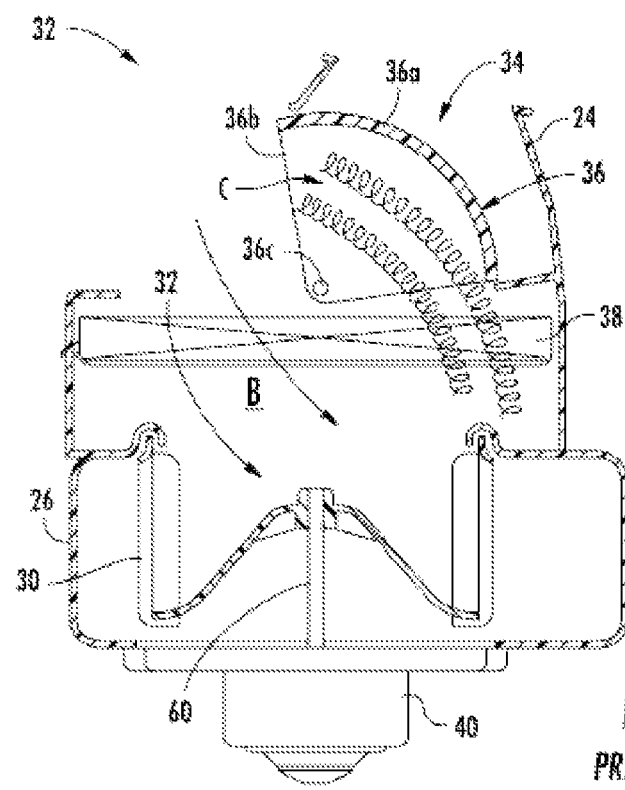
FIG. 4 is a simplified view of an inlet and scroll casing with the prior art door.
Figure 5:
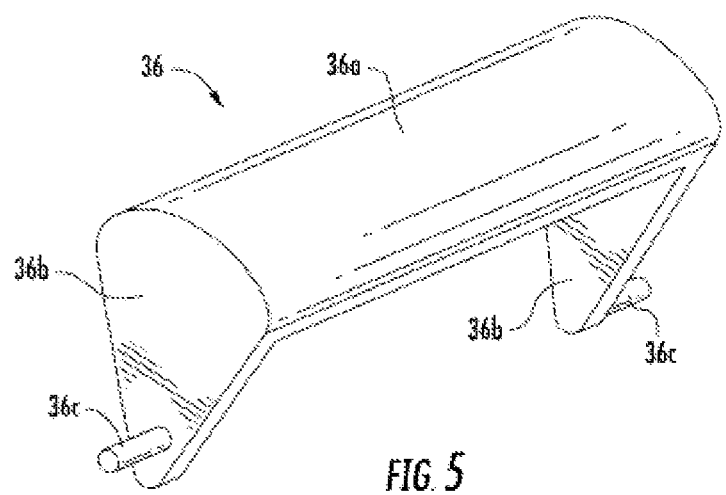
FIG. 5 is a perspective view of the prior art rotary door.

FIG. 4 displays a larger view in more detail of the fresh air/recirculation air switching case 24 and the scroll casing 26 portion of FIG. 2. However, this figure is slightly modified from FIG. 3. That is, in this example, the air filter 30 is disposed at a position that is lower than the position of the rotary door shaft 36*c*. Here and as illustrated in FIG. 5, more detail of the prior art rotary door 36 is displayed. The rotary door 36 comprises an arc-shaped circumferential wall 36*a* is so formed as to connect outer-peripheral ends of two fan shaped side plates 36*b*. The rotary shaft 36*c* is provided at the position of an angular corner portion of each fan shaped side plate 36*b* (the center position of the curvature radius of the circumferential wall 36*a*). The rotary door 36 is rotatably supported in the case 24 with the rotary shaft 36*c* as its center. The rotary door 36 may be manufactured easily, for example, it may be molded plastic or polymer by way of non-limiting example.

The limitations with the prior art is with the layout of case 24 combined with the arc-shaped circumferential wall 36*a* of the rotary door 36. As air flow B passes through the case, in FIG. 4, turbulence C can be created underneath the rotary door. This turbulence C causes unwanted noise to travel to the passenger cabin 12. Prior art solutions as discussed in the background section are insufficient to completely eliminate the noise.

Figure 6:
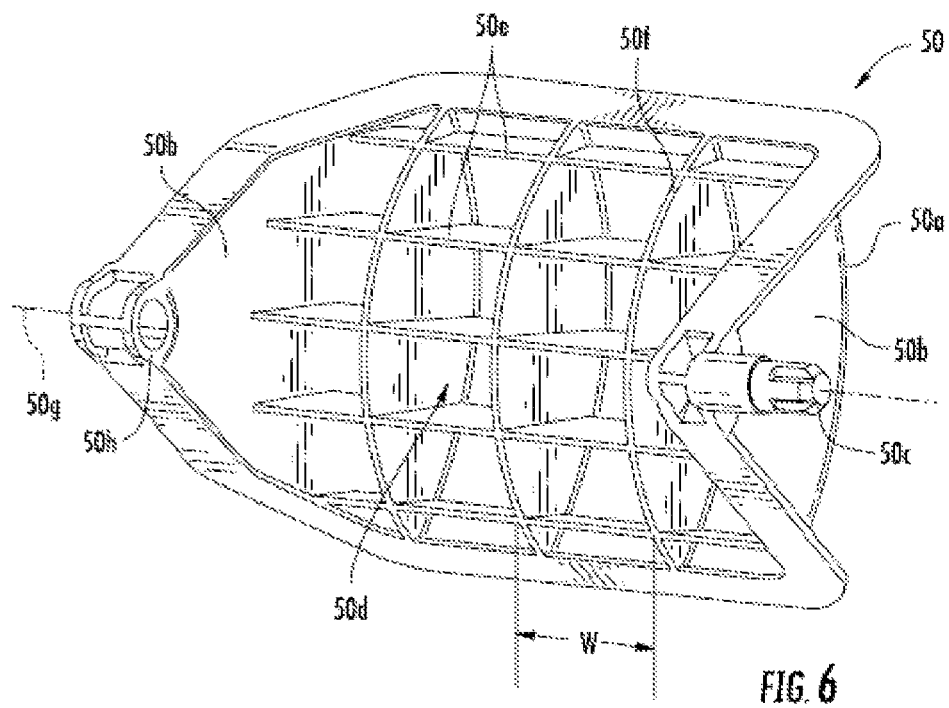
FIG. 6 is a perspective view of the preferred embodiment rotary door.
Figure 7:
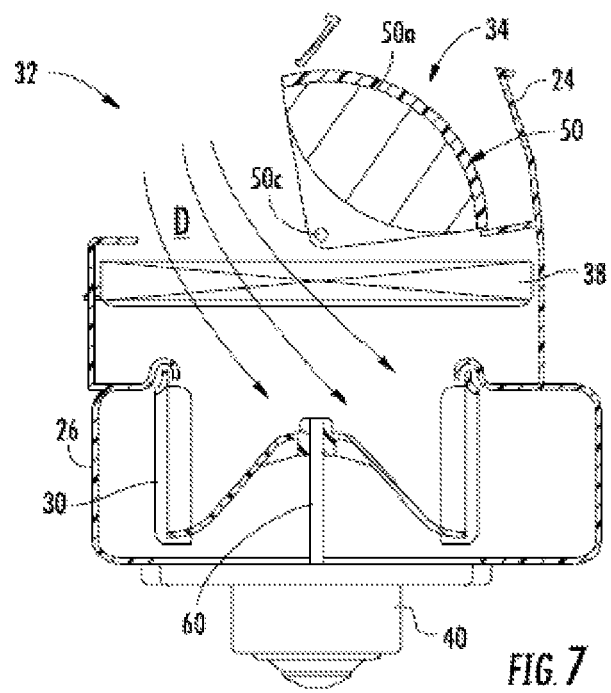
FIG. 7 is a simplified view of an inlet and scroll casing with the preferred embodiment of the rotary door.

FIG. 6 and FIG. 7 illustrate the preferred embodiment of the current invention. FIG. 6 illustrates the rotary door 50. The rotary door 50 comprises an arc-shaped circumferential wall 50*a* is so formed as to connect outer-peripheral ends of two fan shaped side plates 50*b*. A rotary shaft 50*c* is provided axially outwardly at the position of an angular corner portion of each fan shaped side plate 50*b* (the center position of the curvature radius of the circumferential wall 50*a*). It is also known in the art that the shafts could be bearing holes to accept shafts that are built into the casing, or the rotary door 50 could contain one shaft 50*c* and one bearing aperture 50*h* to accept a shaft (not shown) from the inlet casing 24. Extending inward from the circumferential wall 50*a* is a grid 50*d* in a convex arc shape; the circumferential wall 50*a* and convex grid 50*d* provide a general cross section of the door to be an oval shape. The grid 50*d* has lateral stringers 50*e* that are different heights that span from one side plate 50*b* to the opposite side plate 50*b*. The grid also contains medial stingers 50*f* in a convex curved shape that are perpendicular to the lateral stringers 50*e* and extend toward the center axis 50*g* of the rotary door 50. The stringers 50*f* and 50*e* combine to create the overall grid 50*d*. This grid 50*d* can be integrally molded with the rotary door 50 or may be a separate structure bonded to the rotary door 50, by way of non-limiting example.

FIG. 7. Illustrates rotary door 50 integrated into the fresh air/recirculation air switching case 24 and the scroll case 26, in fresh air mode which only allows outside air from the inlet 32. The rotary door 50 is rotatably supported in the case 24 with the rotary shaft 50c as its center. The rotary door convex grid 50d takes up the volume of space underneath the circumferential wall 50a. As previously noted, the prior art door 36, provides a pocket underneath the circumferential wall 36a, this pocket allows for the undirected air flow that turns into turbulent air C and creates objectionable noise. The grid 50d does not act as an air guide to direct the air flow and remove turbulence, similar to prior art noted in the background section; rather it assumes the volume underneath the circumferential wall and prevents airflow from assuming that space and becoming turbulent behind the rotary door 50, and this is illustrated by airflow D. Another advantage of preferred embodiment is that by eliminating the turbulent air flow C behind rotary door 50, the airflow distribution across the blower fan 30 is improved. This improvement also lowers noise concerns in vehicle cabin 12, it also increases the efficiency of the blower fan 30 and motor 40.

It is understood in the art that the size and radius of the door can be customized to fit a particular use and package. The radius of the circumferential wall 50a can range from 50 millimeters to 150 by non-limiting example. The preferred embodiment is an integrally formed single piece rotary door 50 and convex grid 50d. Because the rotary door 50 is a single piece the height of the medial stringers 50f, measured from the circumferential wall 50a, is critical for manufacturing, the current height H represents the furthest distance from the medial stringer 50f away from the circumferential wall 50a. The preferred embodiment range is 10-50 millimeters; this height range was chosen for its noise reduction capability but also for manufacturing, any larger of an H dimension may create tooling breakage issues in a high volume molding machine (not shown). The width W of the openings of the grid shown in FIG. 6, is determined by manufacturing tooling capability. The preferred embodiment can range from 10-50 millimeters, which allows for efficient manufacturing of the integrally molded rotary door 50 and grid 50d. As known in the art, having a larger opening allows for a larger and stronger molding slide tool (not shown) which prevents unwanted tool breakage and manufacturing efficiency issues. However, as recognized in the art, if the convex grid 50d may a separate piece that is later bonded to the rotary door 50, the height could be smaller to address specific noise, manufacturing and packaging needs. Additionally, the height of the medial stringer 50f could be less than the preferred embodiment using any method recognized in the art and based on testing to provide the best outcome for noise and manufacturing.

Figure 8:
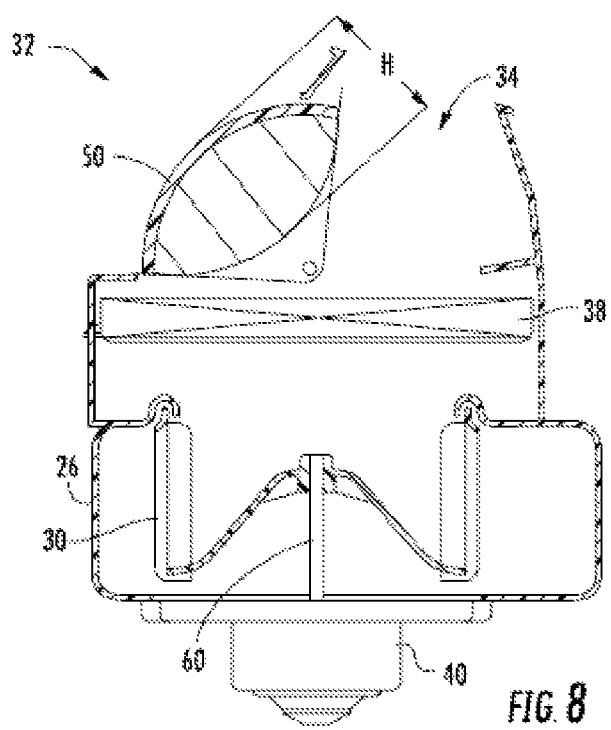
FIG. 8 is a simplified view of an inlet and scroll casing with the preferred embodiment of the rotary door.

FIG. 8 illustrates the rotary door 50 in full recirculation mode. The outside inlet 32 is completely closed, and inside inlet 34 is completely open. It is understood in the art that the rotary door 50 can be rotatably moved within the casing 24 by electric servo, motor and a linkage, cables or the like by way of non-limiting example. Additionally it is understood in the art that the rotary door 50 can be placed in any position ranging from completely closing fresh inlet 32 to completely closing recirculation inlet 34, or anywhere in-between. It is also understood in the art that a rotary door can be placed anywhere in the HVAC system. A rotary door can be used as a fresh recirculation door in the inlet case, a mode door or a temperature door in the mode case. The preferred embodiment can be implemented in any rotary door application to prevent turbulent air flow.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. An automotive ventilation unit comprising:
   an inlet air flow case having a first and second air inlet, the first air inlet for introducing air from a passenger compartment, the second air inlet for introducing air from outside;
   a scroll case attached downstream of the inlet air flow case;
   a blower fan disposed in the scroll case downstream from the inlet air flow case and the first and second air inlets;
   a rotary door rotatably disposed within the inlet air flow case between the fan and first and second air inlet, the rotary door having an axis, the rotary door having an arc-shaped circumferential outer wall for opening or closing the first inlet and second inlet; and
   a convex arc-shaped grid portion protruding from an inner surface of the circumferential wall wherein the circumferential wall and convex arc-shaped grid portion form oval cross-sectional shape;
   wherein the circumferential wall spans from a first end to a second end of the rotary door;
   side wall plates are connected to the circumferential wall at the first end and second end, the side wall plates are perpendicular to the center axis and span radially from the center axis to the first and second circumferential wall ends;
   the convex arc-shaped grid portion is formed by lateral stringers that span from one side plate to another sidewall plate and convex medial stringers are perpendicular to the lateral stingers.

2. An automotive ventilation unit set forth in claim 1, wherein said convex grid portion is integrally formed with said circumferential wall of said rotary door.

3. An automotive ventilation unit set forth in claim 1, further comprising:
   an air filter disposed at a position between said rotary door and said blower fan.

4. An automotive ventilation unit set forth in claim 1, further comprising:
   wherein the rotary door is configured to pivot about the axis in the inlet casing.

5. An automotive ventilation unit set forth in claim 1, further comprising:
   rotation shafts connected to both the side wall plates, respectively, around the rotation center axial line.

6. An automotive ventilation unit set forth in claim 1, the door further comprising: a rotation shaft connected to the one side wall plate, the another side wall plate containing a bearing aperture, around the rotation center axial line.

7. An automotive ventilation unit set forth in claim 1, further comprising:
   a mode case connected to the scroll case downstream from the blower fan, wherein the mode case contains a evaporator for cooling air, a heater core for increasing the temperature of air, and a mode door to selectively control the temperature of the air.

\* \* \* \* \*